United States Patent Office 3,071,616
Patented Jan. 1, 1963

3,071,616
METHOD OF CONVERTING A SECONDARY PHOSPHINE SULFIDE TO THE CORRESPONDING SECONDARY PHOSPHINE
Leo C. D. Groenweghe, St. Louis, Mo., assignor to Monsanto Chemical Company, St. Louis, Mo., a corporation of Delaware
No Drawing. Filed Oct. 1, 1959, Ser. No. 843,617
5 Claims. (Cl. 260—543)

This invention relates to the conversion of secondary phosphine sulfides to the corresponding secondary phosphines. According to the invention this conversion is carried out by reacting a secondary phosphine sulfide with a tertiary phosphine, thereby converting the secondary phosphine sulfide to a secondary phosphine, while converting the tertiary phosphine to a tertiary phosphine sulfide.

The term "secondary phosphine" is used herein to refer to compounds of trisubstituted phosphorus atoms wherein two of the substituents on the phosphorus atom are organic radicals attached to the phosphorus atom through phosphorus/carbon bonds, and wherein the third substituent is an element or group connected to the phosphorus atom through a bond other than a phosphorus/carbon bond. The organic phosphorus/carbon bonded radical can be simple unsubstituted hydrocarbyl radicals such as alkyl, aryl, alkaryl, aralkyl, alkenyl, or cycloalkyl, or they may be heterocyclic radicals or hydrocarbyl radicals having other substituents such as halogen, sulphonic acid, hydroxyl, ether, amino, etc. groups attached thereto. As stated above, the third group attached to the phosphorus atom can be substantially any element or group other than ones attached through a phosphorus/carbon bond. For example, this third group can comprise a halogen atom, and especially a chlorine, bromine or fluorine atom, a hydroxyl, or amino group, an alkoxy or thioalkyl group, a mono- or dialkyl substituted amino group, etc.

The term "secondary phosphine sulfide" is used herein to refer to compounds of quadruply substituted phosphorus atoms containing three substituents as in the above-described secondary phosphine, but also containing a sulfur atom in the isolated position on the phosphorus atom.

The term "tertiary phosphine" is used herein to refer to trisubstituted compounds of phosphorus in which all three of the substituents connected to the phosphorus atom are attached thereto through a phosphorus/carbon bond. As in the case of the secondary phosphines discussed above, the phosphorus/carbon bonded substituents of the tertiary phosphines can be either unsubstituted or substituted hydrocarbyl radicals.

The term "tertiary phosphine sulfide" is used herein to refer to quadruply substituted compounds of phosphorus containing the same substituents as the tertiary phosphines defined above, but also containing a sulfur atom attached to the isolated position of the phosphorus atom.

The term "isolated position" is used herein to refer to that position on a quadruply substituted phosphorus atom at which a lone oxygen or sulphur atom is attached to the phosphorus. This is the position often designated in structural formulae by a double bond between the phosphorus and the oxygen or sulfur atoms. The other three positions on the phosphorus atoms will be termed "non-isolated" positions.

The reactions carried out according to this invention can be represented by the following equation:

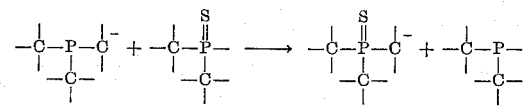

Surprisingly, this reaction is irreversible and gives a substantially quantitative yield of the desired products.

In order to have the reaction take place at reasonably rapid rates, it is preferably carried out at somewhat elevated temperatures—for example, above about 50° C., and preferably above about 100° C. The only upper limitations upon the reaction temperature are ones imposed by virtue of potential decomposition of the reactants or products at extremely high temperatures. Such decomposition temperatures will vary with the particular radicals or groups present on the specific compounds utilized or produced. In most cases adequate reaction rates are obtained without substantial decomposition at temperatures between about 80° C. and about 400° C., and preferably between about 120° C. and about 300° C.

Further details with respect to practice of the present invention will be readily apparent from the following typical example of a preferred embodiment of the invention.

Example

About 4 grams of dimethyl chlorophosphine sulfide and about 3 grams of tributyl phosphine were heated together in a sealed glass tube at about 180° C. for 65 hours. Analysis of the reaction mixture by nuclear magnetic resonance spectra disclosed that all of the tributyl phosphine had been utilized in reacting on a mole-for-mole basis with the dimethyl chlorophosphine sulfide to give a quantitative yield (based upon tributyl phosphine) of dimethyl chlorophosphine.

Results comparable to those obtained in the above-described reaction are also obtained by reaction of chloromethyl(ethyl)bromophosphine sulfide and trimethylphosphine; diphenylfluorophosphine sulfide and diethyl (β - sulfoethyl)phosphine; phenyl(n-hexyl)methoxyphosphine sulfide and phenyl(β-chloroethyl)methylphosphine; d-i-propylphosphine sulfide and phenyldimethylphosphine; ethyl(phenyl)hydroxyphosphine sulfide and tribenzylphosphine; ethyl(β - methoxylethyl)(ethylthio) phosphine sulfide and ethyl(dibenzyl)phosphine; di(p-chlorophenyl) - N,N-diethylaminophosphine sulfide and tri(γ-hydroxy - n - propyl)phosphine; β-chloroethyl(i-propyl)N - methylaminophosphine sulfide and tricyclohexylphosphine; diallyl(allylthio)phosphine sulfide and tri(β-bromoethyl)phosphine; methyl(m-ethylphenyl)(-β-fluoethoxy)phosphine sulfide and tri(β-ethoxyethyl)phosphine; dipyridyl (p-chlorobenzylthio)phosphine sulfide and tri(2,4 - dimethylphenyl)phosphine; dicyclohexyl-N, N - di(β - methoxylethyl)aminophosphine sulfide and methyldi(3 - n-pentyl)phosphine; dibenzyl [1,5 dibromo 3-(n-pentyl)thio] phosphine sulfide and ethyl bis(3 chloro,trihydro - 4 - pyranyl)phosphine; phenyl(1,4 cyclohexadiene - 2 - yl)N,N - bis - 4(1 - 4 pyranyl)aminophosphine sulfide and tri(β-furyl)phosphine; bis(1,2 thiopyran-2-yl), 4 - isoxazolylthiophosphine sulfide and di-n-propyl, 2 indenylphosphine; and methyl(p-ethoxyphenyl)(1-methyl,2-ethyl, tetrahydro - 4 - pyrryloxy)phosphine sulfide and methyl(ethyl)(tetrahydro-p-isoxazine-2-yl)phosphine.

What is claimed is:
1. The method of reacting a secondary phosphine sulfide with a tertiary phosphine at an elevated temperature above about 50° C., whereby said secondary phos- phine sulfide is converted to the corresponding secondary phosphine, said secondary phosphine sulfide containing a quadruply substituted phosphorus atom having a sulfur atom attached to the isolated position on said phosphorus atom, wherein one substituent on said phosphorus atom is a member of the group consisting of halogen, amino, hydroxyl, alkoxy, and thioalkyl radicals, and the two remaining substituents other than said sulfur atom on said phosphorus atom are organic radicals attached to said phosphorus atom through phosphorus/carbon bonds and are selected from the group consisting of hydrocarbyl, monocyclic heterocyclic containing ring oxygen, monocyclic heterocyclic containing ring nitrogen, halogen-substituted hydrocarbyl, and amino-substituted hydrocarbyl radicals.

2. The method of reacting a secondary monohalophosphine sulfide with a tertiary phosphine at an elevated temperature above about 50° C., whereby said secondary monohalophosphine sulfide is converted to the corresponding secondary monohalophosphine, said secondary monohalophosphine sulfide containing a quadruply substituted phosphorus atom having a sulfur atom attached to the isolated position on said phosphorus atom, wherein one substituent on said phosphorus atom is a halogen radical and two substituents on said phosphorus atom are organic radicals attached to said phosphorus atom through phosphorus/carbon bonds and are selected from the group consisting of hydrocarbyl, monocyclic heterocyclic containing ring oxygen, monocyclic heterocyclic containing ring nitrogen, halogen-substituted hydrocarbyl, hydroxy-substituted hydrocarbyl, alkoxy-substituted hydrocarbyl, and amino-substituted hydrocarbyl radicals.

3. The method of reacting a dihydrocarbyl monochlorophosphine sulfide with a trihydrocarbyl phosphine at an elevated temperature above about 100° C., whereby said dihydrocarbyl monochlorophosphine sulfide is converted to the corresponding dihydrocarbyl monochlorophosphine.

4. The method of reacting a dialkyl monohalophosphine sulfide with a trialkyl phosphine at a temperature between about 80° C. and about 400° C., whereby said monohalophosphine sulfide is converted to the corresponding dialkyl monohalophosphine.

5. A method for converting dimethyl chlorophosphine sulfide to dimethyl chlorophosphine, which method comprises intermixing said dimethyl chlorophosphine sulfide with a stoichiometric proportion of tributyl phosphine and heating the resulting mixture at a temperature between about 100° C. and about 300° C. while maintaining said dimethyl chlorophosphine sulfide in physical contact with said tributyl phosphine.

No references cited.